United States Patent [19]

Quient

[11] 4,374,688

[45] Feb. 22, 1983

[54] MARBLEIZED CERAMIC ARTICLES

[76] Inventor: Andrew Quient, 45 Sugar Maple La., P.O. Box 66, Glen Cove, N.Y. 11542

[21] Appl. No.: 244,635

[22] Filed: Mar. 17, 1981

[51] Int. Cl.[3] .......................... B44F 9/04; C04B 33/34

[52] U.S. Cl. .......................................... 156/89; 428/35

[58] Field of Search ............... 428/15, 35, 36; 156/61, 156/89

[56] References Cited

U.S. PATENT DOCUMENTS 3,634,179 1/1972 Anderson .............................. 428/15

*Primary Examiner*—Henry F. Epstein

[57] ABSTRACT

Ceramic articles with a marbleized pattern are produced on a potter's wheel from an incompletely mixed combination of a plurality of plastic compositions of contrasting pigmentation. The incompletely mixed combination is molded to obtain a multifaceted or fluted surface which is cut during rotation to trim away the facets or flutes, producing an article with an annular cross section and the required marbleized pattern.

2 Claims, 9 Drawing Figures

MARBLEIZED CERAMIC ARTICLES

BACKGROUND OF INVENTION

Certain rocks and minerals are characterized by patterns of contrasting pigmentation which appear on cut surfaces. Examples include marble, malachite and opal. These patterns contribute to the aesthetic appeal of these materials and are here termed marbleized.

Many rock and mineral materials which are most appealing and valuable in cut form are either rare or difficult to fabricate by cutting. Consequently attempts have been made to produce articles of manufacture which are imitative of natural materials. Among such articles are those produced on a potter's wheel and having patterns which are applied to the surface of the articles by stamping, brushwork, decals or multicolored glazing. Such articles are not, however, the same as those of natural rocks or minerals nor the same as the articles produced in accordance with this invention.

The patterns on cut surfaces of natural rocks and minerals are the surface traces of three dimensional bodies which are characteristic of each material. These bodies may be folded or undulating laminae or striae or amorphous masses with either sharply defined or diffuse delineation within the rock or mineral.

In the prior art there are methods of obtaining surface patterns, much as on terrazo flooring by grinding and polishing hardened hydraulic cement with aggregate material. The cut sections of such materials reveal the outlines and texture of the aggregate particles which are sharply delineated along a complete perimeter. Although terazzo is imitative of certain natural rocks the surface pattern is not considered to be marbleized in the context of the present invention.

In the prior art there are methods of obtaining a marbleized pattern on ceramic ware by molding non-homogeneous materials on a potter's wheel and, after drying, cutting facets or fluting to expose a faceted or fluted surface with the desired pattern. This method is extremely difficult and laborious, especially on surfaces which are doubly concave or doubly convex. Moreover, it is more satisfying to have most ceramic articles in the conventional rounded form which is characteristic of articles produced on a potter's wheel without additional modification.

SUMMARY OF INVENTION

This invention is of a method of producing ceramic articles shaped as by the potter's wheel with the additional feature of a marbleized pattern on at least one surface. A plastic mixture with non-uniform pigmentation is formed on a multifaceted or fluted die which rotates while the plastic mixture is compressed against the die by application of shaping tool which is non-rotating.

After completion of shaping the shaping tool is withdrawn and the plastic is hardened as by drying while being supported on the die. The hardened mass is then removed from the die and cut on the multifaceted or fluted surface while being rotated. The cutting tool, which does not rotate, is applied to the faceted or fluted surface thereby removing the facets or flutes and establishing a circular perimeter and an annular cross section.

The cutting operation requires that the mass be "leather hard", or hard enough to be moved without significant distortion. It is convenient to cut the hardened mass while it is supported on a cradle which is rotated. The mass, now in the shape of the article, has now developed the marbleized pattern. It is further dried, fired, glazed and again fired.

The plastic mixture of non-uniform pigmentation is preferably made from two or more component plastic mixtures, each substantially homogeneous in pigmentation but contrasting with one another. Partial mixing of the components is achieved in various ways. For example, the component plastic mixtures may be fed continuously into a screw conveyor which extrudes the mixture through a die.

The extruded mixture from the die may be cut to length segments suitable for shaping on the rotating die. The shaping operation leads to further mixing and striation which is, on the faceted or fluted surface, in evidence as streaks which are generally parallel in the direction of rotation.

Within the plastic mass and near the surface the striae undulate with the facets or flutes. When these are cut from the rotating hardened mass in accordance with this invention the marbleized pattern is developed by the periodic section across the undulating striae.

BRIEF DESCRIPTION OF DRAWINGS

FIG. 3*a* illustrates a section elevation and FIG. 3*b* is a plan view of the mold.

DETAILED DESCRIPTION OF INVENTION

There are two embodiments based on application either to articles made by jiggering which require the design pattern on the inside, or concave, surface, or those made by jollying which require the pattern on the outside, or convex, surface.

In cutting the facets of a concave surface the cutting template first engages the midsection of each facet and rounds this face progressively until it is completely rounded to the edges which then disappear into a completely circular section. With a convex surface the cutting action begins at the edges which merge into an expanding arc which eventually becomes a complete circle. In both cases, and also with an initially fluted surface the shape is ultimately the same as if the article had been made solely by molding on a potter's wheel but with the added feature of the marbleized pattern.

Figure 1:
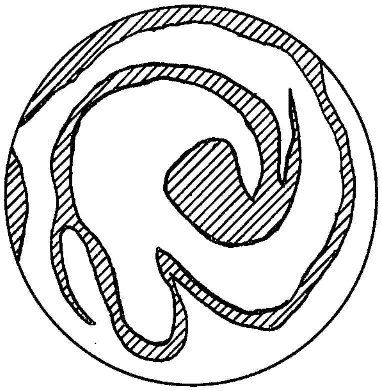
FIG. 1 represents a section of a clay batch in preparation for jiggering. The batch is typical of one prepared by hand kneading with two colors according to this invention.
Figure 2A:
FIGS. 2*a* and *b* illustrate the patterns which are obtained on a vase and on a bowl by the method of this invention.
Figure 2B:
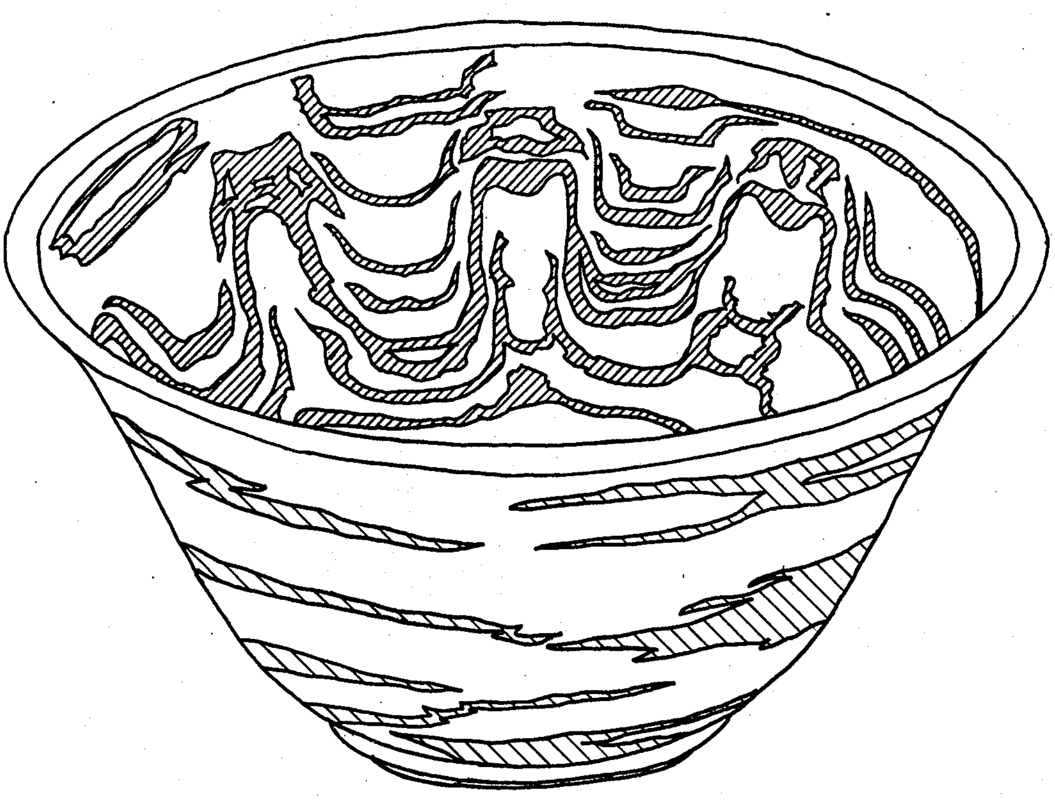
Figure 3A:
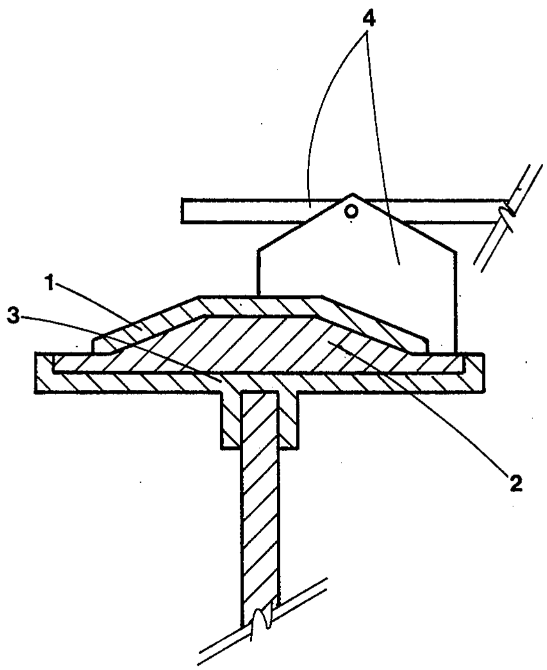
FIGS. 3*a* and *b* illustrate apparatus for producing open ware such as plates and bowls by jiggering in accordance with this invention.

In FIGS. 3*a* and *b*, a mass of clay, 1, is placed on the faceted jigger mold, 2. The mold is affixed to the turning wheel head, 3. In FIG. 3*a* the jigger arm, 4, is lowered on to the rotating clay mass, 1, forcing the clay to conform with the faceted jigger mold. After the clay mass conforms with both the template and jigger mold, the template is removed. The jigger mold with the formed article is then removed from the wheel head and set aside for partial drying to a state of leather hardness.

Figure 5A:
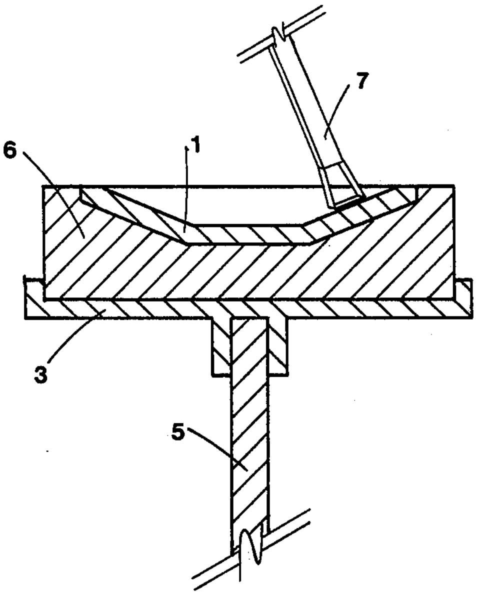
FIGS. 5*a* and *b* illustrate apparatus for cutting the faceted surfaces of bowls and vases respectively. This apparatus is old in art but its application to the trimming of facets or flutes in accordance with this invention is novel.

The article is then removed from the jigger mold and placed in a cradle illustrated in FIG. 5*a*. The cradle, 6, conforming in shape with the convex face of the article, is turned by the wheel head, 3, and spindle, 5. The cutting tool, 7, is lowered, thereby engaging the faceted surface and cutting progressively to a surface which is round.

The piece is then dried, coated with transparent glaze and fired under conditions of temperature and time for the maturation of the clay and glaze.

Figure 4A:
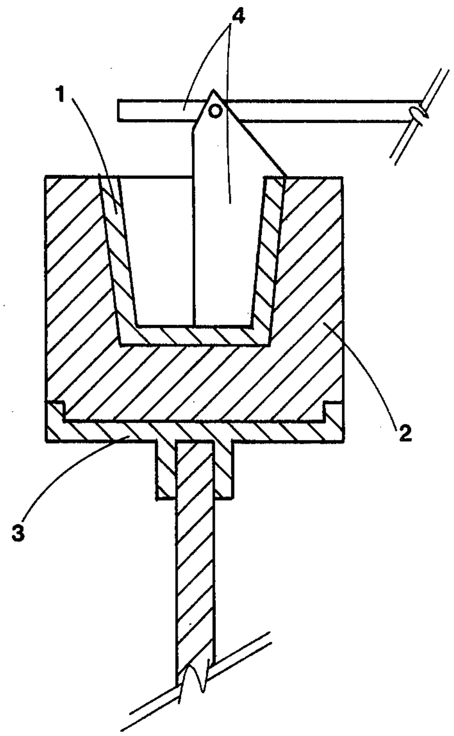
FIGS. 4*a* and *b* illustrate the equivalent apparatus for producing closed ware such as vases by jollying according to this invention. As for FIGS. 3*a* and *b*, the mold face is illustrated as being faceted.
Figure 3B:
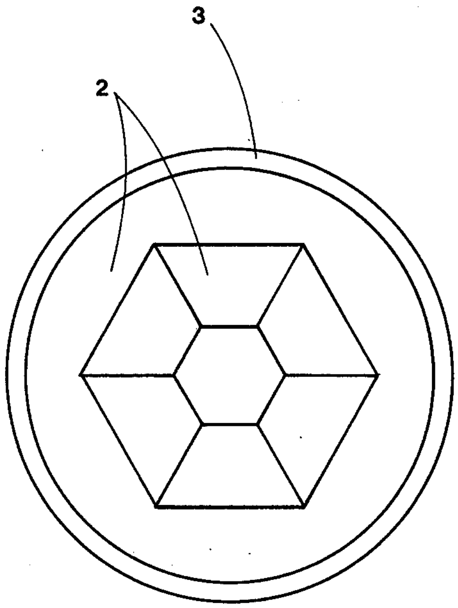
Figure 4B:
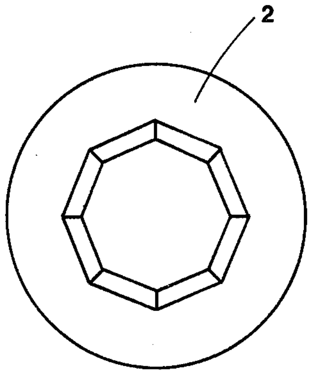

The use of jollying in accordance with the second embodiment of this invention is illustrated in FIGS. 4*a* and *b*. A clay mass, 1, is placed in the faceted jolly mold, 2. The mold is affixed to a rotating wheel head, 3. In FIG. 4*a* the jigger arm, 4 is lowered onto the rotating clay mass, 1, forcing the clay mass to conform with the faceted jolly mold. After conformity with both the template and faceted jolly mold, the template is removed. The jolly mold with the formed article is then removed from the wheel head and set aside for partial drying to leather hardness.

Figure 5B:
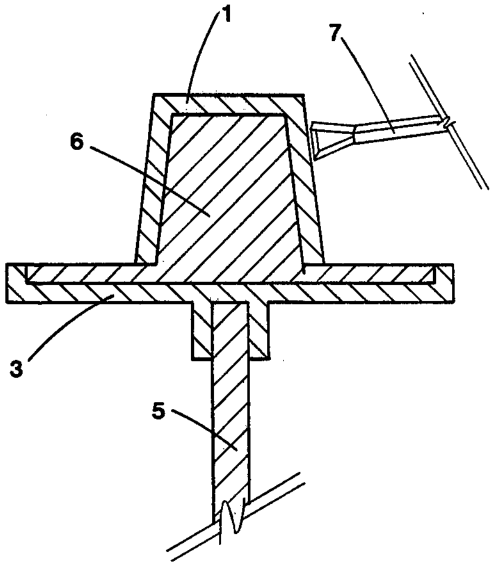

The clay article is then removed from the jolly mold and placed on a mandrel as shown in FIG. 5*b*. The clay piece 1 is turned by the wheel head 3 and spindle 5, while on the cradle, 6. The cutting tool, 7, is brought against the outer surface, cutting the faceted surface to one which is round. This exposes the marbleized pattern. The piece is then processed as for the first embodiment and as in the prior art.

Having described this invention I claim:

1. A method of producing ceramic articles with at least one surface having a pattern of sectioned striae, said method including in combination:

a. mixing to incomplete homogeneity a plurality of plastic ceramic masses of contrasting pigmentation to a composite mass,
b. forming the composite mass between a multi-faceted or fluted die which is rotated and a contour-forming template which is stationary,
c. hardening and cutting the hardened composite mass to remove the facets or fluting, and
d. firing to maturation of the cut composite ceramic mass.

2. A method of claim 1 in which the hardened composite mass is coated with a transparent glaze.

* * * * *